March 29, 1932. R. J. BURKARD 1,850,992
GRASS TRIMMER
Filed Nov. 5, 1930
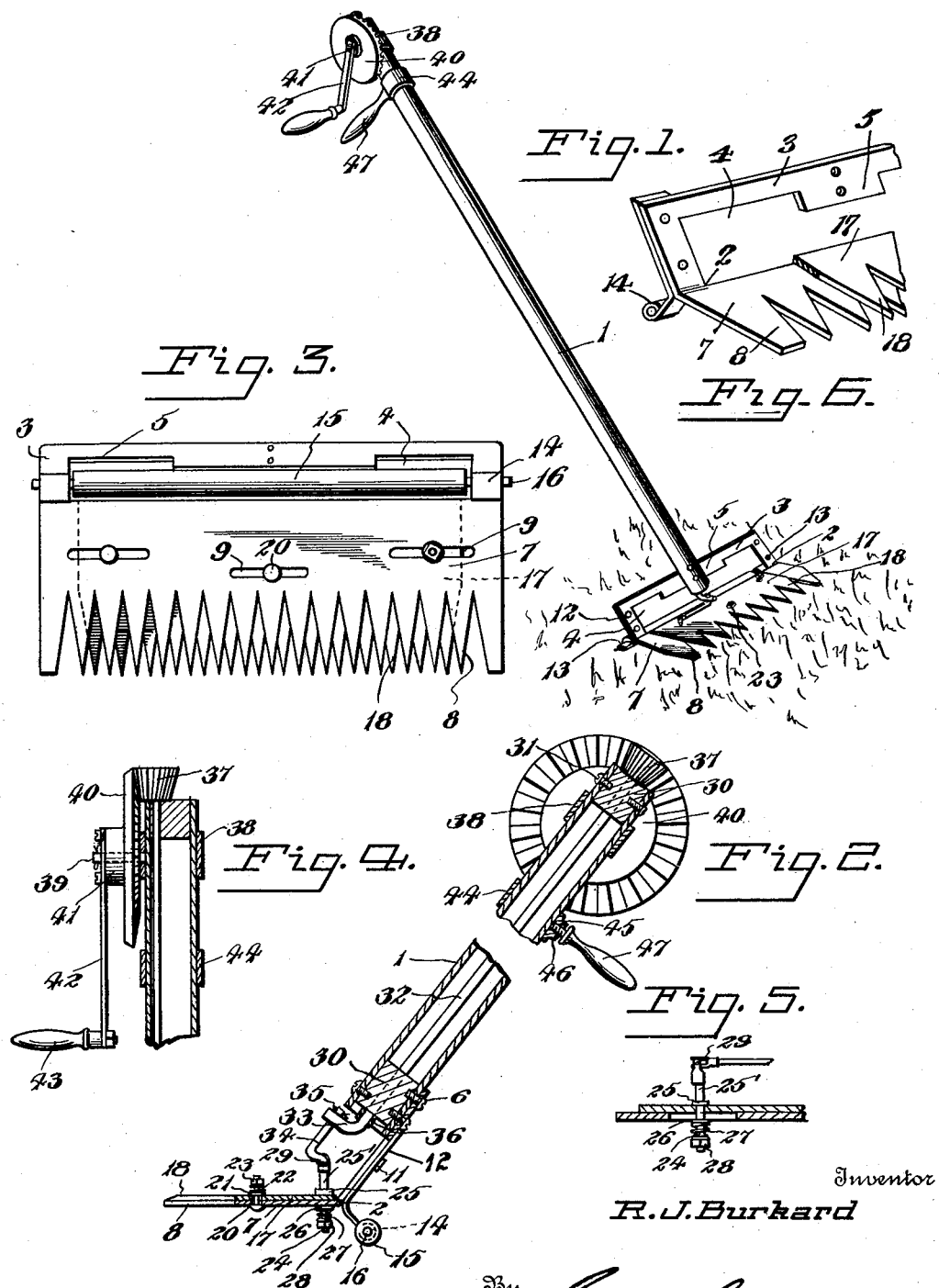
Inventor
R. J. Burkard Patented Mar. 29, 1932

1,850,992

UNITED STATES PATENT OFFICE

ROLAND J. BURKARD, OF SHEBOYGAN, WISCONSIN

GRASS TRIMMER

Application filed November 5, 1930. Serial No. 493,666.

This invention relates to improved grass trimmers.

One object of the invention is to provide a device of this character employing relatively fixed and movable cutter bars cooperating to cut grass at each oscillation of the movable cutter bar.

Another object of the invention is to provide a grass trimmer wherein one of the connecting bolts employed is provided with a universal joint for connecting the movable cutter bar with the actuating shaft employed.

A further object of the invention is to provide a grass trimmer wherein the handle utilized may be adjusted so that persons of different heights may operate the device with ease.

A still further object of the invention is to provide a grass cutter wherein the fixed cutter bar is provided with an upstanding rear portion having an opening which permits easy escape of cut grass rearwardly over said movable cutter bar and its actuating mechanism so that the parts will not become clogged.

Other and incidental objects of the invention not mentioned in the foregoing will appear during the course of the following description.

The invention is illustrated in the accompanying drawings, wherein,

Figure 1 is a perspective view of the device,

Fig. 2 is an enlarged fragmentary vertical sectional view of the device,

Fig. 3 is an enlarged bottom plan view with the handle bar removed,

Fig. 4 is an enlarged fragmentary sectional view showing the handle and gears employed for rotating the actuating shaft, Fig. 5 is an enlarged detail sectional view showing the universal joint of the movable cutter bar, and Fig. 6 is an enlarged detail view of the frame.

Referring now more particularly to the drawings, the numeral 1 indicates a tubular preferably metal handle bar and mounted on the lower end of the handle bar, as best seen in Fig. 1 of the drawings, is a frame 2 which is substantially obtuse angular. The frame is provided with an upstanding obliquely disposed rear portion 3 which is cut away centrally to provide a longitudinally disposed aperture 4 defining side margins and an upper margin 5 which is widened centrally. Extending through the widened central portion of the upper margin 5 are bolts 6 which are screwed into the lower end portion of the handle bar 1 and removably connect the frame with said handle bar.

The frame 2 is, of course, provided with a flat fixed cutter bar 7 having a series of V-shaped teeth 8 which are beveled at their cutting edges. Formed in the fixed cutter bar 7 are preferably three longitudinally disposed staggered oblong slots 9, one of said slots being disposed in close spaced relation to the base of centrally disposed teeth of the series of teeth 8, and the other two of said slots being disposed in a parallel plane with the plane of the inner edge of the cutter bar 7 in close spaced relation thereto, one of the latter two slots being disposed near each end of said cutter bar. Secured to the rear portion 3 of the frame 2 is a pair of preferably metal brackets 12 which are bent obliquely near their lower ends to substantially right angles with the rear portion 3. Extending through the brackets 12 and the side margins of the rear portion are bolts 13 for rigidly connecting said brackets with said rear portion 3. As best seen in Fig. 2 of the drawings, the lower end portions of the brackets are rolled to form bearings 14. Associated with the frame is a preferably wooden roller 15 having stub shafts 16 which are journaled by the bearings 14, the roller, of course, serving to provide a movable support for the device.

Associated with the fixed cutter bar 7 is a movable cutter bar 17 having a series of V-shaped teeth 18 provided with beveled cutting edges. The movable cutter bar 17, of course, cooperates with the cutter bar 7 and is adapted to be oscillated laterally upon the upper surface of said cutter bar 7. Extending through the slots 9 of the cutter bar 7 and through the movable cutter bar 17 are connecting bolts 20 having heads abutting the margins of the slots 9 and having their shanks extending upwardly through said slots. Fitting over the shanks of the bolts 20 and abutting the upper surface of the cutter bar 17 are washers 21 and surrounding the shanks of the bolts 20 and abutting the upper surfaces of the washers are coil springs 22 which hold the movable cutter bar in slidable relation with the fixed cutter bar. Screwed on the upper ends of the shanks of the connecting bolts 20 are nuts 23 which may, of course, be tightened or loosened for varying the tension of the coil springs 22, the bolts, washers, coil springs, and nuts slidably connecting the movable cutter bar with the fixed cutter bar.

Extending through the movable cutter bar 17 and through the remaining one of the slots 9 is a connecting bolt 24 having a collar 25 rigidly secured thereto and disposed at a point substantially medially of the ends of the bolt, the lower surface of the collar abutting the upper surface of the movable cutter bar 17 and preventing downward displacement of said bolt. The bolt is provided with a stem 25'. Fitting over the lower end portion of the bolt 24 is a washer 26 having its side portions abutting the marginal edges defined by slot 9. Surrounding the lower end portion of the bolt 24 below and abutting the lower surface of the washer 26 is a coil spring 27 and screwed on the end portion of the bolt 24 and abutting the lower end of the coil spring 27 is a nut 28 which may be tightened or loosened for varying the tension of said coil spring. The bolt 24, of course, cooperates with the bolts 20 to slidably connect the movable cutter bar with the fixed cutter bar and also provides means for connecting the movable cutter bar actuating mechanism, which will be hereinafter described. Mounted on the upper end portion of the bolt 24 is a universal joint 29.

Mounted in the handle bar 1 at each end thereof are bushings 30 which are preferably held in position by screws 31. Extending longitudinally within the handle bar 1 and disposed eccentrically of the axis thereof is an actuating rod 32 which is journaled by the bushings 30 and, of course, extends eccentrically therethrough. As best seen in Fig. 2 of the drawings, the rod 32 is bent near its lower end at a right angle to provide a crank 33 and connecting the crank with the universal joint 29 is a pitman 34 having one end portion bent upwardly and journaled by the end portion of the crank, and the other end portion thereof screwed into one yoke of the universal point 29. Extending through the upwardly bent portion of the pitman 34 is a cotter key 35 which removably connects said pitman with the crank 33. Rigidly mounted on the actuating shaft 32 and disposed to overlie the lower end face of the lowermost portion 30 is a collar 36 which prevents accidental upward sliding movement of the actuating shaft 32.

Rigidly but removably mounted on the upper end portion of the shaft 32 is a relatively small pinion 37 and surrounding and rigidly secured to the upper end portion of the handle bar 1 is a collar 38. Screwed into the collar is a stub shaft 39 and rotatable on the stub shaft 39 is a beveled gear 40 meshing with the teeth of the pinion 37. It is to be understood, of course, that the relative sizes of the gears 37 and 40 may be altered for varying the ratio between said gears and thereby varying the speed of the pinion when rotated at a given speed of the gear 40. The beveled gear 40 is provided with a hub 41 having a flat outer face, and screwed to the flat outer face of the hub 41 is a crank 42. Screwed or otherwise secured to the outer end of the crank is a crank handle 43 which may be formed of wood or other suitable composition. Surrounding the handle bar 1 and disposed below the collar 38 is a collar 44 which is snugly but slidably mounted on said handle bar and is provided with a reinforcing shoulder 45. Extending through the shoulder 45 of the collar 44 is a set screw 46 having its inner end portion normally engaging the outer surface of the wall of the handle bar 1 for limiting the collar in an adjusted position on said handle bar. Fixed to the set screw 46 is a handle 47.

In use, when it is desired to trim tall grass or the like, the user grasps the handle 47 with one hand and the crank handle 43 with the other hand. The handle 47 is, of course, used for maintaining the handle bar 1 in proper operative position which, as best seen in Fig. 1 of the drawings, is such a position wherein the handle bar will be disposed at an angle substantially 60° to the horizontal. The crank is then rotated for rotating the gear 40 which will, of course, in turn rotate the pinion 37 and the actuating shaft 32. The crank 33 will be caused to rotate and the pitman 34 will be shifted and, as said pitman is connected with the universal joint 29 and thus to the movable cutter bar 17, a rocking or oscillating movement will be communicated to said movable cutter bar. The cutter bar will cooperate with the fixed bar 8 so that the teeth will coact for cutting grass or the like which is forced into said teeth by the forward movement of the device which, of course, is made possible by the roller 14, the teeth of the cutter bars coacting to effect a cutting operation both upon a forward and rearward movement of the movable cutter bar.

Attention is directed to the fact that the bolt 24 not only aids in slidably connecting the relatively fixed and movable cutter bars, but also provides a mounting means for the universal joint 29 so that additional coupling between the pitman and said movable cutter bar is obviated. The manufacture of the device will, therefore, be greatly simplified due to the fact that a less number of working parts will be employed. Attention is further directed to the fact that inasmuch as the rear portion 3 of the frame is provided with a transversely disposed aperture, cut grass will be permitted to pass over the pitman and connecting bolts and through said aperture to the ground or a suitable collector attached to the device so that clogging of the parts will be largely prevented. It is pointed out that, inasmuch as I have provided an adjustable handle for the device, it will be possible for persons of various heights to operate the device with equal facility.

Having thus described the invention, I claim:

A grass trimmer including a one piece frame comprising a flat fixed cutter bar and an upstanding rear portion disposed in angular relation to said flat fixed cutter bar, a movable cutter bar associated with the fixed cutter bar, brackets carried by the upstanding rear portion and having corresponding free end portions bent to form bearings, a roller having trunnions journaled by said bearings, said roller and brackets cooperating to support the device for movement over a surface to be trimmed, a handle bar carried by the frame and having its lower end portion secured to the upstanding rear portion of the frame, an actuating rod rotatably mounted in the handle bar and having its lower end bent to form a crank, means carried by the movable cutter bar and having a stem, a link connecting the crank and stem whereby a reciprocating movement will be transmitted from the crank to the movable cutter bar, and means carried by the handle for rotating the rod and the crank for reciprocating the movable cutter bar.

In testimony whereof I affix my signature.

ROLAND J. BURKARD. [L. S.]